United States Patent
Ferrentino

[11] 4,009,932
[45] Mar. 1, 1977

[54] COMPOSITE OPTICAL FIBER ELEMENT FOR TELECOMMUNICATION CABLES

[75] Inventor: Antonio Ferrentino, Monza (Milan), Italy

[73] Assignee: Industrie Pirelli S.p.A., Milan, Italy

[22] Filed: July 25, 1975

[21] Appl. No.: 598,753

Related U.S. Application Data

[63] Continuation-in-part of Ser. No. 468,765, May 10, 1974.

[30] Foreign Application Priority Data

Aug. 2, 1974 Italy ................................. 25886/74

[52] U.S. Cl. .............................................. 350/96 B
[51] Int. Cl.² ......................................... G02B 5/16
[58] Field of Search ............. 350/96 B, 96 C; 65/4, 65/DIG. 7

[56] References Cited

UNITED STATES PATENTS 3,691,001  9/1972  Takahashi et al. ............... 350/96 B
3,865,466  2/1975  Slaughter .......................... 350/96 B
3,887,265  6/1975  Margolis et al. .................. 350/96 B

*Primary Examiner*—John K. Corbin
*Assistant Examiner*—Rolf Hille
*Attorney, Agent, or Firm*—Brooks Haidt Haffner & Delahunty

[57] ABSTRACT

A composite optical fiber element for telecommunication cables comprising an optical fiber with at least three metal filaments parallel thereto, spaced therefrom and disposed therearound in planes intersecting the fiber and at substantially equal angles to each other. The optical fiber and the filaments are surrounded by and embedded in a synthetic thermoplastic resin material. Filaments of the same diameter are equally spaced from the optical fiber. Individual elements, or groups of such elements in a sheath, may be helically wound around a supporting core to form a telecommunication cable.

13 Claims, 4 Drawing Figures

COMPOSITE OPTICAL FIBER ELEMENT FOR TELECOMMUNICATION CABLES

This application is a continuation-in-part of my co-pending application Ser. No. 468,765, filed May 10, 1974 and entitled "OPTICAL FIBER CABLE AND MANUFACTURE THEREOF".

The present invention concerns a composite, unitary element for the transmission of modulated light signals, e.g., in telecommunication cables, and which comprises an optical fiber.

As is known, optical fibers are fibers made of glass or of plastic synthetic material, of a very small diameter, of the order of 0.1 –0.01 mm., and are constituted by a tubular core and by a sleeve or coating whose refractive index is smaller than that of the core, for example, a refractive index of 1.50 –1.52 for the sleeve and 1.56 –1.64 for the core.

Because of the differences between the refractive indexes of the materials respectively constituting the core and the sleeve, light entering from one end of the fiber is totally reflected inside the fiber itself and may be transmitted along the axis of the latter, even if it is curvilinear, as far as the other end of the fiber. By adopting particular types of highly transparent glass, it has been found that the initial impulse is transmitted to the terminal end of the fiber with relatively little attenuation.

Optical fibers of this type can be of interest also for use as elements intended for the transmissionn of signals in telecommunication cables. The use of such fibers involves, however, some problems deriving mainly from the typical physical and mechanical characteristics of the fibers themselves.

In fact, it is to be taken into account that said fibers, which are extremely thin, can satisfactorily withstand tension stresses, but such fibers have a low ultimate elongation and are, therefore, brittle. It follows that, for the employment of such fibers in telecommunication cables, in which they are to be stranded together in a unit, it is first of all necessary to solve the problems of arranging the fibers in an orderly manner and of reducing the deformations and stresses which may act on the fibers themselves.

It is evident that the optical fiber can be incorporated, with an appropriate support, in the cable according to several methods, such as, for example, by means of a stranded or lapped winding. During the winding process, the fiber is subjected to stresses, not easily foreseen, along different planes.

Moreover, even when the cable is finished, further stresses, also acting on planes which cannot be predicted with certainty, can take place during the operations employed in laying or transporting the cable itself.

It is therefore understandable that the use of an optical fiber involves the problem of providing a protection for the same against the various stresses acting along different planes.

The present invention has, as one object, the provision of a composite, unitary element comprising an optical figer, intended for the transmission of signals in telecommunication cables, and having a structure which overcomes the problems mentioned hereinbefore.

Accordingly, the principal object of the present invention is a composite, unitary element for the transmission of signals in telecommunication cables which comprises, in a synthetic, thermoplastic resin material, an optical fiber and at least three metallic filaments, each lying at equal distance from said fiber and in a plane of its own passing through the optical fiber, each plane being inclined at substantially equal angles with respect to the next adjacent planes.

In the preferred embodiments, the composite, unitary element comprises three metallic filaments arranged around the optical fiber at the same distance from it, said filaments being in three separate planes which intersect the fiber and which are inclined at 120° with respect to one another or comprises four metallic elements at the same distance from the optical fiber and which lie in two separate planes which intersect the fiber and which are orthogonal with respect to each other.

Said preferred embodiments are particularly advantageous for maintaining the integrity of the optical fiber. In fact, the fiber, for its whole length and therearound, is protected by the filaments which, along with the fiber, are contained in a synthetic thermoplastic material.

The efficiency of said protection is comparable with that which would be obtained, for example, by providing a continuous jacket around the fiber which is able to absorb the stresses acting in all possible planes. In fact, in practice, the symmetrical arrangement of the three metallic filaments at planes arranged at 120° to each other or of the four metallic filaments in orthogonal planes, provides, in any stress plane, at least one filament resistant to tension and two filaments resistant to compression, or two resistant to tension and one to compression, such filaments having physical characteristics which enable them to oppose the stresses and prevent deformation of the optical fiber.

For these reasons, the composite, unitary element having hereinbefore described structure is particularly suitable to be used as an element for the transmission of signals in a telecommunication cable. Accordingly, a further object of the present invention is a telecommunication cable comprising at least one composite, unitary element as described hereinbefore.

The present invention will be better understood from the following detailed description of preferred embodiments thereof, which description should be considered in conjunction with the accompanying drawings, in which.

Figures 1, 2:
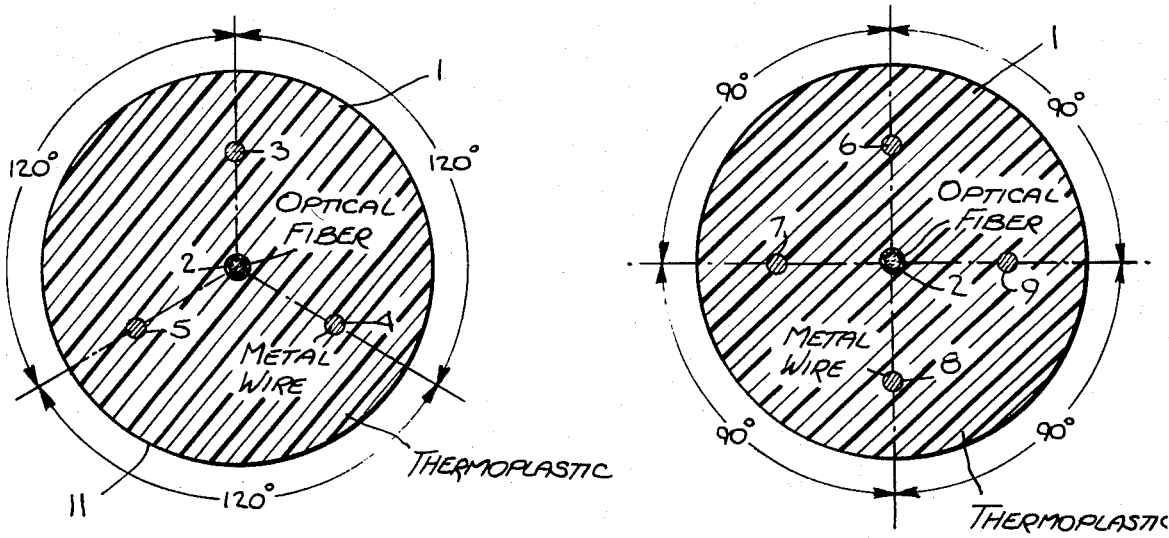
FIG. 1 is an enlarged, cross-sectional view of a preferred embodiment of a composite element of the invention.
FIG. 2 is an enlarged, cross-sectional view of a further embodiment of a composite element of the invention.

The composite element 11 illustrated in FIGS. 1 and 2 constitutes an element for transmitting modulated light signals which form part of telecommunication cables according to the present invention.

The element 11 comprises a support 1 formed by a synthetic thermoplastic material containing, interiorly thereof, a glass fiber 2 disposed at the center of the support 1, and at least three metallic filaments 3, 4 and 5 disposed around the fiber 2 to protect it. The physical characteristics of the filaments 3–5 are selected in a manner obvious to those skilled in the art so as to prevent bending of the element 11 by an amount which will break the fiber 2. In other words, the filaments 3-5 stiffen the element 11 and absorb the greatest part of the stresses, and the stresses on the fiber 2 are practically negligible. Preferably, the modulus of elasticity of the filaments 3-5, when they are made of metal, is about 21,000 kilograms per square millimeter, or about three times the modulus of elasticity of the optical fiber 2. Preferably, also, the filaments 3-5 can be bent around a smaller radius of curvature than the optical fiber 2 without breaking. Said filaments 3-5 also have a coefficient of thermal expansion substantially equal to that of the fiber 2 in order to avoid subjecting the fiber 2 to objectionable deformation because of the thermal expansion and contraction of the filaments 3-5.

The arrangement and number of the filaments 3-5 inside the support 1 may vary, provided that at least three metallic filaments are used, each filament lying at the same distance from the fiber 2 and in a plane of its own passing through the fiber 2, the angles between the planes being substantially equal. For example, the number of filaments may be greater, but for ease of manufacture and to keep costs to a minimum, the number of filaments preferably is not greater than twelve, an increase above such number not justifying, in improved protection, the increase in manufacturing difficulties and the expense. In fact, four such filaments, arranged as described hereinafter, are usually adequate.

By means of said arrangement of the metallic filaments, such filaments are practically distributed on the surface of an imaginary cylinder around the fiber 2 and with a spacing such that they can efficiently withstand the stresses in each plane.

In particular, in the preferred embodiments, said filaments are three in number, as shown in FIG. 1, and are arranged to lie in planes forming angles of 120° with respect to one another, or are four in number (filaments 6, 7, 8 and 9 shown in FIG. 2) and are arranged to lie in two planes orthogonal to each other.

Considering in greater detail the parts of the composite element 11, the diameter of the optical fiber 2 is between 0.01 and 0.1 mm., and the diameter of the filaments 3-9 is about the same order of magnitude as that of the fibers 2. It is preferred to make the filaments 3-9 of steel or of steel moving with a nickel percentage of 42%.

The support 1, which is made of synthetic thermoplastic resin material, may be made, for example, of a polyester, a polyamide or a polyolefin, such materials having appropriate properties. The support 1 can have a different cross-sectional shape. For example, it may be square, rectangular, etc., with a maximum transverse dimension of about 1.5 mm.

Obviously, the small dimensions of the support 1 permit, advantageously, the grouping in a limited space of a large number of composite elements 11, as potential means intended for the transmission of signals. In this case, each support 1 for the optical fibers 2 is formed with a thermoplastic material which is preferably loaded with carbon black so as to avoid the the possibility that the transmission of light inside one optical fiber will be influenced by the light coming out of continguous fibers.

Figure 3:
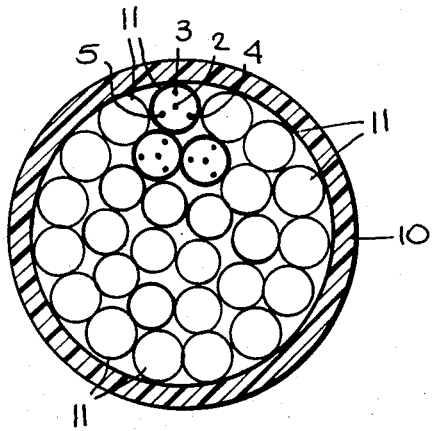
FIG. 3 is a cross-sectional view of several composite elements of the invention grouped together.

The composite elements 11 can be associated together in various ways, for example, by stranding, and can be contained in a single sheath 10 made of polyethylene or of another thermoplastic material, as shown FIG. 3.

As mentioned hereinbefore, the composite element 11 is useful as an element for the transmission of signals in telecommunication cables. Said element 11, because of its particular structure, which includes metallic filaments for protecting the optical fiber, can be joined with other so as to form a bunch of stranded fibers in a telecommunication cable and will be subjected to practically negligible stresses.

Figure 4:
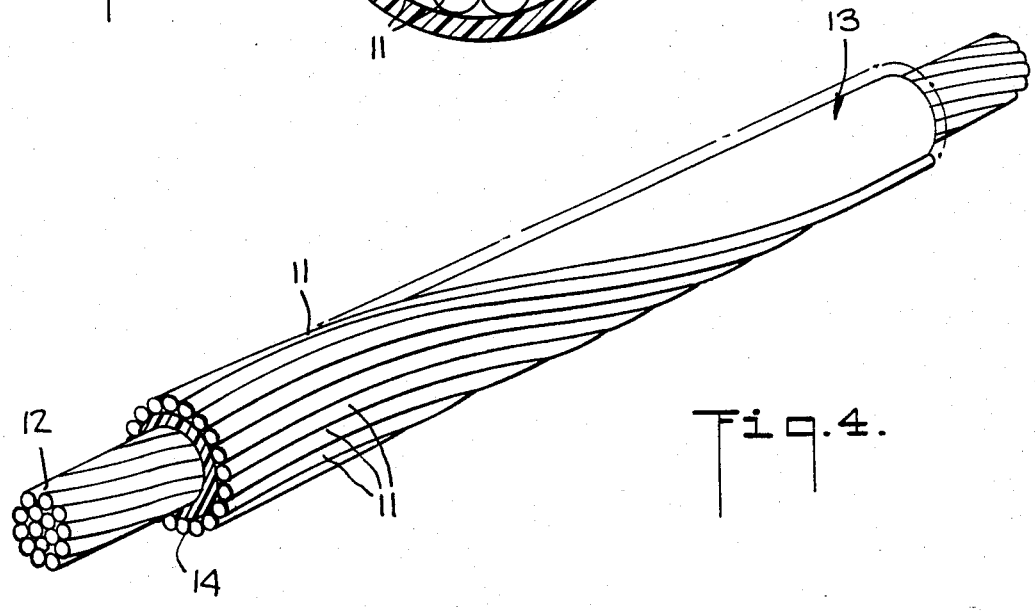
FIG. 4 is a perspective view of a telecommunication cable comprising the composite element.

In particular, FIG. 4 shows the application of a plurality of composite elements 11 helically wound around the core 13 of a telecommunication cable, the core 13 comprising a stranded wire rope 12 and a protective covering 14. Instead of individual elements 11, the group of elements 11 surrounded by the sheath 10, as shown in FIG. 3, may be wound around the core 13 in the same manner as the individual elements 11.

The stranded arrangement of the element 11 about the cable core 13 is advantageous, since said stranding, having, for example, a pitch greater than 100 mm., permits the use of fibers with a developed length exceeding the cable length by only a small amount.

The metallic filaments 3-9 could be replaced by non-metallic filaments, provided that the physical characteristics of the material used and the arrangement of said non-metallic filaments are such as to increase the flexing resistance of the composite element 11. Examples of non-metallic materials useful for the filaments 3-9 are glass and plastics having a modulus of elasticity at least equal to the modulus of elasticity of the optical fiber 2 and which will not break with normal bending of the element 11.

In addition, it will be understood that the protection for the optical fiber 2 can be obtained in a manner practically equivalent to that disclosed above by using filaments 3-9 arranged on planes having inclination angles slightly different form one another, as even under such conditions it is possible for the filaments to be disposed so as to be compression-resistant and tension-resistant.

Also, a protection of the fibers equivalent to that obtained in the examples shown in FIGS. 1 or 2 could be obtained by adopting filaments 3-9 having different diameters. In the latter case, the optical fiber 2 would not be arranged at the same distance from the filaments, but instead, would be disposed in the position of more reduced flexing stress, namely, along the neutral axis of the resistance section determined by the characteristics of the filaments. For example, the fiber 2 would be located farther from a smaller diameter filament than from a larger diameter filament.

Although preferred embodiments of the present invention have been described and illustrated, it will be understood by those skilled in the art that various modifications may be made without departing from the principles of the invention.

What is claimed is:

1. A composite optical fiber element comprising a light-transmitting optical fiber and at least three continuous, reenforcing filaments embedded in and surrounded by a synthetic thermoplastic resin, said filaments being made of a material having a modulus of elasticity at least equal to the modulus of elasticity of said fiber, being spaced from and around said fiber, being substantially parallel to said fiber and respectively lying substantially in planes parallel to and intersecting said fiber and inclined with respect to each other at substantially equal angles, said filaments stiffening said element and absorbing the greatest part of the stresses when said element is subjected to bending whereby said filaments substantially reduce the stress which would otherwise be applied to said optical fiber with bending of said element.

2. A composite optical fiber element as set forth in claim 1, wherein each of said filaments has a temperature coefficient of expansion substantially equal to the temperature coefficient of expansion of said optical fiber.

3. A composite optical fiber element as set forth in claim 1, wherein said modulus of elasticity of said filaments is greater than the modulus of elasticity of said fiber and the radius of curvature of said filaments without rupture is smaller than the corresponding radius of curvature of said fiber.

4. A composite optical fiber element as set forth in claim 1, wherein said optical fiber has a diameter in the range of from 0.01 to 0.1 millimeters and said filaments have a diameter of the same order of magnitude as the diameter of said fiber.

5. A composite optical fiber element as set forth in claim 1, wherein the maximum cross-sectional dimension of said element is less than 1.5 millimeters.

6. A composite optical fiber element as set forth in claim 1, wherein each of said filaments has the same diameter and said filaments are equally spaced from said fiber.

7. A composite optical fiber element as set forth in claim 6, wherein each of said filaments is made of metal.

8. A composite optical fiber element as set forth in claim 7, wherein the modulus of elasticity of each filament is at least three times the modulus of elasticity of said optical fiber.

9. A composite optical fiber element as set forth in claim 7, wherein said metal is selected from the group consisting of steel and steel alloys.

10. A composite optical fiber element as set forth in claim 1, wherein there are three filaments and said planes are inclined at an angle of substantially 120° with respect to each other.

11. A composite optical fiber element as set forth in claim 1, wherein there are four filaments and said planes are substantially orthogonal to each other.

12. A telecommunication cable comprising a plurality of composite optical fiber elements each constructed as set forth in claim 1 and arranged in parallel relation.

13. A cable as set forth in claim 12, wherein said cable comprises a central core and said elements are helically wound around said core.

* * * * *